July 18, 1939.  H. BATES  2,166,112

TOY TYPEWRITER

Original Filed Nov. 16, 1934  3 Sheets-Sheet 1

Harry Bates
INVENTOR

BY
ATTORNEY

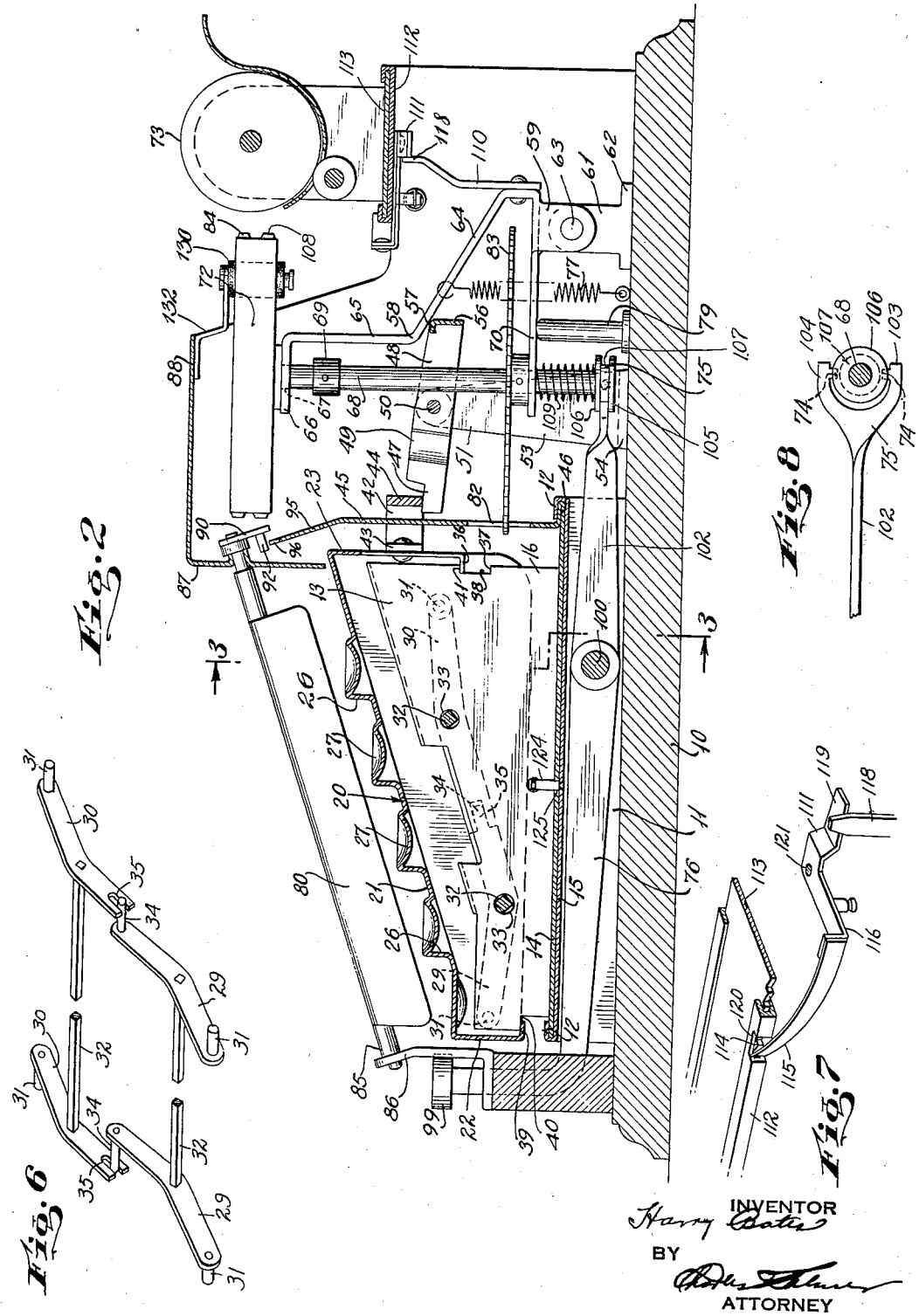

July 18, 1939.  H. BATES  2,166,112
TOY TYPEWRITER
Original Filed Nov. 16, 1934   3 Sheets-Sheet 3
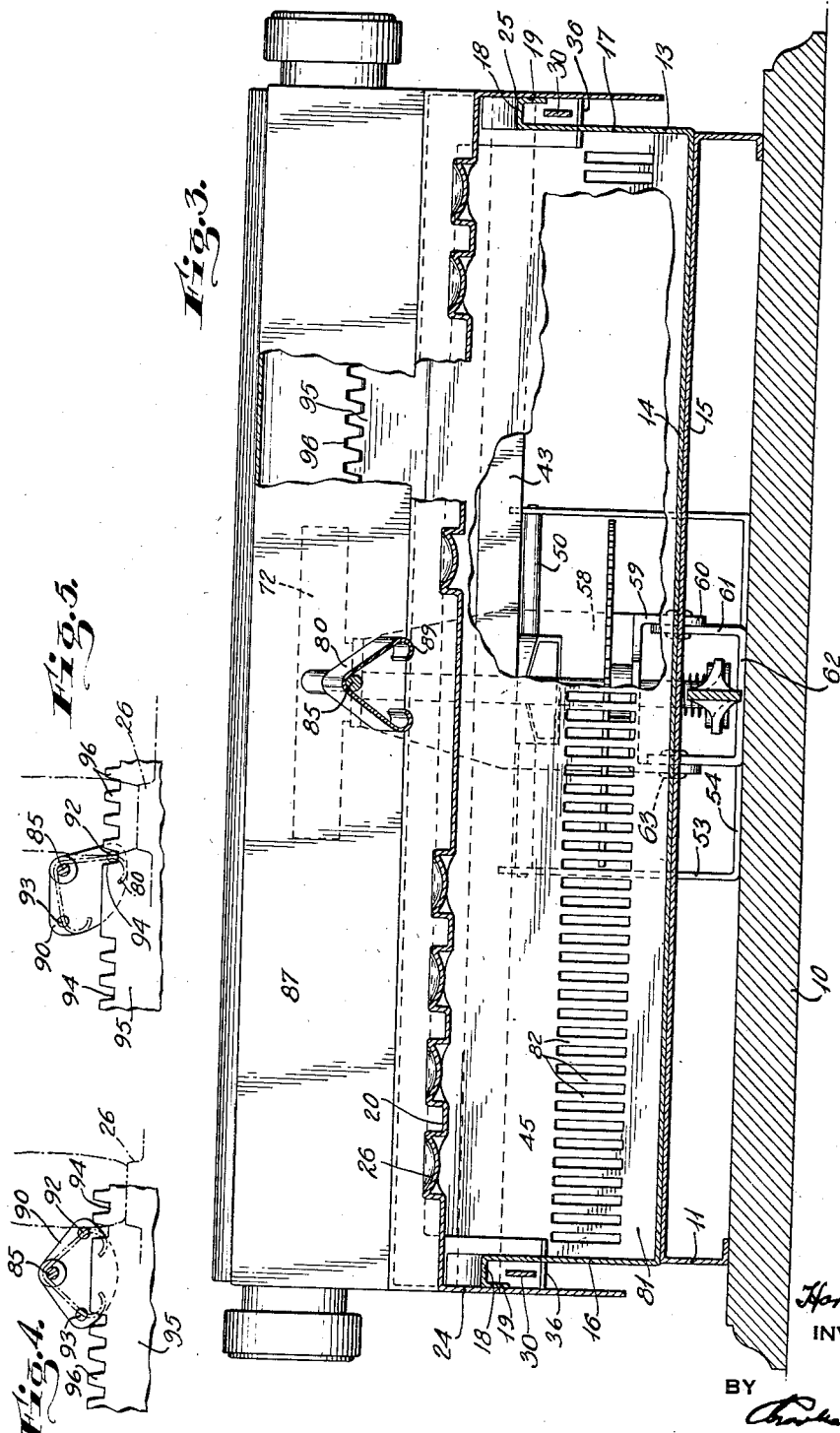
Harry Bates
INVENTOR
BY
ATTORNEY Patented July 18, 1939

2,166,112

UNITED STATES PATENT OFFICE 2,166,112

TOY TYPEWRITER

Harry Bates, New York, N. Y., assignor to Bates Laboratories, Inc., New York, N. Y.

Substitute for abandoned application Serial No. 753,262, November 16, 1934. This application September 26, 1938, Serial No. 231,836

21 Claims. (Cl. 197—47)

This application is a substitute for my application Serial No. 753,262, filed Nov. 16, 1934, which was unintentionally abandoned on or about September 4, 1938.

The subject matter of the present invention deals with a toy typewriter and more particularly is concerned with an educational toy simulating in appearance and keyboard a portable typewriter and comprising means particularly adapted and conveniently utilized to print characters against a rotatable and step by step laterally shiftable platen.

The invention has as an object to provide a toy typewriter having a bodily and horizontally shiftable keyboard for selectively setting a type wheel in a predetermined position in respect to a platen preparatory to printing.

The invention has as another object to provide a bodily depressable keyboard for tilting a type wheel towards and against the platen to carry into effect the step of printing.

The invention has as another object the provision of a slidable keyboard carriage shiftable in response to lateral displacement of the keyboard, and having means for setting a type wheel to a predetermined position corresponding to the displacement of the keyboard.

The invention has as another object the provision of a rectilinearly displaceable carriage adapted to support a bodily depressable casing simulating a standard keyboard of a portable typewriter.

The invention has as a further object the provision of stop means to limit horizontal displacement of the keyboard and its supporting carriage in the selection of a character on the type wheel and locking means to prevent displacement of the carriage after the selected character has been set to a predetermined position before the platen.

The invention has as a further object the provision of a bodily shiftable keyboard for actuating a slidable carriage to set a rotatable type wheel in a certain position preparatory to printing, the keyboard being bodily shiftable relative to the carriage for bodily displacing the previously positioned type wheel to cast an impression against the platen.

The invention has as a further object the provision of means operable pursuant to removal of manual pressure from the keyboard for bodily raising the latter after having been bodily depressed to arrange the type wheel against the platen.

The invention has as a further object the provision of means for automatically horizontally retracting and selfcentering the keyboard after the latter has been shifted either to the right or left from its normal position for selecting and positioning a desired character on the type wheel before the platen.

The invention has as a still further object to provide a toy typewriter having large and small type and means for normally printing a selected character of the small type and other means for elevating the type wheel preparatory to printing a selected character of the large type.

The invention has as a further object the provision of a type wheel carried by a normally vertically disposed shaft adapted to be actuated and set by the displacement of the keyboard supporting carriage and mechanism responsive on bodily downward displacement of the keyboard relative to its carriage for tilting the shaft and bodily advancing a selected portion of the type wheel against the platen.

Further objects, advantages and features of the invention will appear as the description herein progresses, reference being made to the accompanying drawings in which:

Fig. 2 is a transverse section taken on the line 2—2 of Fig. 1.

Fig. 3 is a longitudinal section taken on the line 3—3 of Fig. 2.

Fig. 4 is a detail which shows the normal position of an oscillatable stop or finger piece member and associated locking means carried by the stop but illustrated in a nonlocking relation with a rack of the keyboard carriage.

Fig. 5 is a view similar to Fig. 4 but showing the locking means interconnected with the keyboard carriage to prevent lateral displacement of the latter.

Fig. 6 is a perspective view of the rockable link system operatively connected to the keyboard and its slidable supporting carriage.

Fig. 7 is a perspective view of the escapement means for actuating the platen carriage step by step and Fig. 8 shows a yoke carried by an extension common to and actuated by either of the shift key levers of the herein disclosed typewriter for elevating a type wheel and positioning large type thereof in proper relation to a platen.

Figure 1:
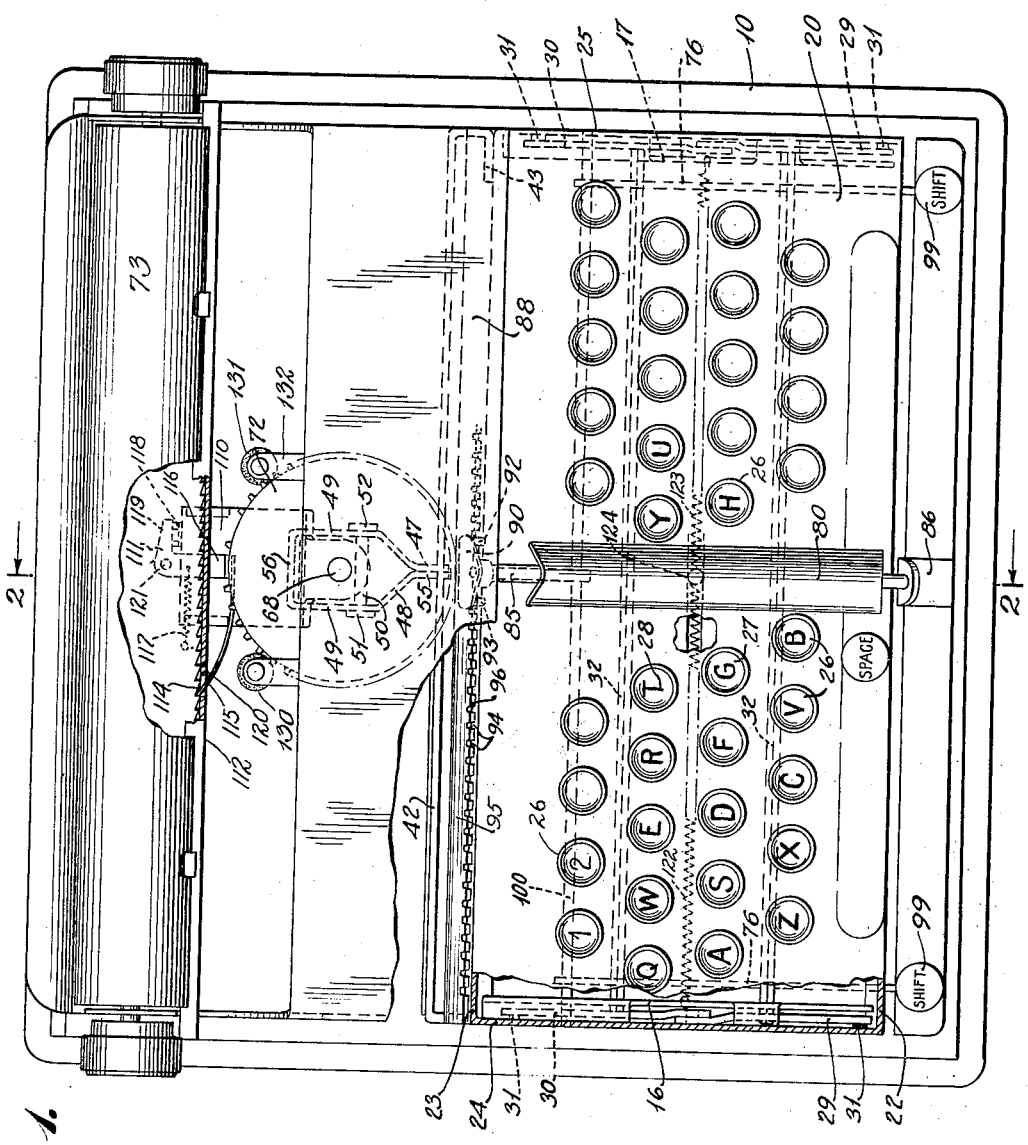
Fig. 1 is a plan view of the toy typewriter according to the invention shown partly broken away to disclose the internal construction.

The toy typewriter according to the invention comprises base 10 on which is fixedly mounted the inverted U-shaped support 11 having front and rear inwardly turned marginal portions or flanges 12 defining longitudinally disposed channels adapted to slidably guide a keyboard supporting carriage generally designated 13. More specifically, the lower wall 14 of carriage 13 is slidably confined or guided in a longitudinally disposed track formed by the upper wall 15 of support 11 and the inwardly disposed flanges 12 thereof.

Integral with wall 14 is a pair of spaced upstanding sides 16 and 17, and each of these sides embodies an outwardly and laterally disposed portion 18 having depending flanges 19.

Associated with the shiftable carriage 13 is a depressible but selfraising keyboard broadly denoted 20. This keyboard is a one-piece hollow member and comprises an upper inclined wall 21, depending front and rear walls 22 and 23, and depending side walls 24 and 25.

Suitably struck out from the upper inclined wall 21 of the keyboard is a plurality of spaced bosses 26 simulating keys of a typewriter keyboard, each of the bosses having an arcuately depressed portion 27 and each of the latter carries suitable indicia, such as 28. Thus formed, the keyboard according to the invention, simulates the appearance of a standard keyboard of a conventional typewriter.

The keyboard 20 may be vertically depressed and bodily moved away from its supporting carriage. For this purpose, a pair of cooperating links or levers such as 29 and 30, are disposed between adjacent sides of the keyboard and the keyboard carriage, the remote ends of each pair of links being pivotally sustained on studs 31, inwardly overhanging and secured to the spaced sides 24 and 25 of the keyboard.

Intermediate portions of corresponding links or levers of each pair are interconnected by a squared shaft 32, the ends of which are closely or non-rotatably confined in correspondingly shaped openings in the links. If, therefore, the links are actuated, the squared shafts will be rocked or partially rotated, that is, correspondingly actuated. It will be noted, however, that the spaced squared rocking shafts 32 are journalled in circular openings 33 in the sides 16 and 17 of the keyboard carriage 13.

The forward link 29 of each pair carries an outwardly projecting fulcrum pin 34 disposed between spaced fingers of a bifurcation 35 of an associated companion rearward link 30. If therefore, the keyboard be depressed, the outer portions of the links of each pair move downwardly, but their inner slidably interconnected portions move upwardly, the spaced squared shafts during the downward displacement of the keyboard being partially rocked or rotated.

Downward displacement of the keyboard is limited by reason of the inwardly turned flanges 36 carried by the rear wall 23 cooperating with the lower shoulders 37 of reentrant recess 38 in the spaced sides 16 and 17 of carriage 13.

Normally, the keyboard is held in a raised or elevated position as illustrated in Fig. 2. In this position, lip or flange 39 of the front wall 22 of the keyboard cooperates with shoulders 40 of the keyboard carriage to limit the upward displacement of the keyboard. Moreover, the spaced flanges 36 of the keyboard serve a similar purpose in that they cooperate with upper shoulders 41 of recess 38 in the spaced sides 16 and 17. Downward displacement of the keyboard in respect to the slidable carriage 13 is also limited by shoulders 37 cooperating with flanges 36.

A loop-shaped strap 42 is provided with inwardly turned end flanges 43 which are riveted to the marginal portions of the rear wall 23 of the keyboard such that the rear vertical wall 44 of the strap is free of and spaced from the rear vertical wall 45 of the carriage 13, the latter being a one-piece member which may be conveniently stamped out of sheet metal or the like, the rear wall 45 having its lower portion extending outwardly and laterally being pressed against the bottom wall 14 to define therewith a flange or rib 46 slidably guided in the channel or track formed by the rearwardly disposed flange 12.

If the keyboard is depressed, the strap is moved bodily downwardly and hence rear wall 44 of the strap strikes or actuates free leg 47 of the pivoted yoke 48 having its spaced parallel arm 49 pivotally sustained on the fulcrum pin 50 carried by the spaced vertical arm 51 and 52 of a U-shaped bracket generally designated 53 having its lower horizontal portion 54 rigidly secured to the base 10.

Yoke 48 is a one-piece member having the forward portions 55 of the arms 49 brought together and appropriately secured to constitute the free leg 47 which is actuated by the loop strap 42. If, therefore, the free leg 47 is actuated by rear wall 44 of the strap, the yoke 48 swings on its pivot 50 and hence the rear brace 56 thereof is elevated. The cam 57 of brace 56 accordingly strikes against the irregularly shaped arm 58 carried by inverted U-shaped yoke 59 having its vertical spaced legs as 60 pivotally associated with vertical legs 61 of a companion yoke 62 securely attached to the base plate 10. More specifically, the legs of yoke 59 are pivotally mounted on suitable fulcrum pins 63 projecting from the stationary yoke 62, the ends of the pins being appropriately upset to prevent lateral displacement of the upper swingable yoke 59 relative to the companion yoke 62.

As illustrated, a lower portion 64 of the irregular shaped arm 58 is inclined and extends forwardly and upwardly, and the inclined part merges with a vertically disposed part 65 which terminates in a horizontally arranged flange 66 having a centrally disposed opening 67 through which the tiltable shaft 68 extends.

Swingable yoke 69 is also provided with a perforated arm 70 adapted to slidably and vertically guide shaft 68, the arm 70 being normally held in a horizontal position (see Fig. 2).

If it is assumed that cam 57 has struck inclined part 64 of the irregular arm 58, the latter will be bodily and rearwardly displaced by reason of the fact that yoke 59 swings on the companion yoke 62, and hence terminal 66 causes the upper portion of shaft 68 to swing rearwardly such that type wheel 72 is moved towards and against the rotatable platen 73, the lower portion of the shaft 68 shifting forwardly in the bifurcated terminal 75 of the pivoted shift key lever, generally denoted 76. In order words, when the keyboard is depressed, shaft 68 is caused to tilt and advance the type wheel to effect the printing operation, the type wheel 72 being suitably keyed to shaft 68 as to move in unison therewith.

Pursuant to the release of downward finger pressure on the part of the operator from a key, the keyboard automatically is elevated and the shaft 68 returns to its normal vertical position. To this end, a helicoidal spring 77 is utilized and has one end attached to the inclined part 64 of arm 58 and another end anchored to base 10. Spring 77 normally urges inclined part 64 to swing inwardly after yoke 59 has been actuated, and pursuant to the removal of finger pressure from the keyboard. Downward displacement of arm 70 is limited by the vertical fixed post 79 which serves as a stop.

Selection of a particular character on the type wheel 72 is carried into effect by moving a selected portion of the keyboard towards a finger-piece member or oscillatable stop broadly denoted 80; that is, if for example, it is desired to print the letter "h", finger pressure is applied to the key or boss identified by letter "h", and the keyboard is bodily moved to the left.

If the keyboard be displaced in a rectilinear and horizontal direction, keyboard carriage 13 will be correspondingly shifted bodily, since the depending flanges 19 of carriage 13 are closely straddled by the depending flanges 24 and 25 of the keyboard, the carriage 13 being horizontally and slidably guided in the track or channel formed by flanges 12, together with the upper wall 15 of the support or spacer 11 mounted on base 10.

The rear wall 45 of carriage 13 comprises a rack 81 having a plurality of vertically disposed spaced teeth 82 adapted to mesh with teeth of gear 83 keyed to shaft 68. Hence, if the keyboard is displaced horizontally, shaft 68 is rotated which in turn causes type wheel 72 to rotate, the type wheel being rotated to arrange the type as 84 for the letter "h", in proper position before the platen, preparatory to printing, that is, if in the selection of a character to be printed, the finger of the operator has brought the key identified by the same character towards the finger piece member 80, and the finger of the operator has actuated the member 80, the proper selection or registration has been effected, namely, the selected type of the type wheel is in proper position with respect to the platen.

The finger piece member 80 comprises a hollow inverted V-shaped body which has its upper contracted portion fixedly mounted on the inclined shaft 85 comprising terminals appropriately journaled in the fixed standard 86 and depending wall 87 of the housing or casing 88. The diverging arm of the finger piece member includes inwardly curved terminals as 89 to present a smooth and curved surface to prevent cutting or injuring a finger of the operator coming in contact therewith.

Attached to the inner terminal of shaft 85, and bodily movable therewith, is a segmental plate 90 having a pair of spaced pins 92 and 93. As previously pointed out, to select a character on the type wheel, the keyboard must be laterally displaced. To accomplish this operation, the operator places a finger (shown in dotted lines in Figs. 4 and 5), on a selected key 26, and then moves the keyboard bodily towards the oscillatable stop 80. The finger strikes one of the diverged arms, shifting the latter, and consequently shaft 85 is rocked or partially rotated. The operator continues to displace the finger piece member in the same direction until the latter no longer can be displaced. At this time the selected character of the type wheel is in proper position for printing. Also at this time, pin 92 enters into a notch as 94 of an inclined rack 95 having a plurality of spaced registering teeth 96, that is to say, pin 92 enters into a notch as 94 corresponding to the character selected, and becomes locked in the notch for the pin 92 falls into the bottom portion thereof. With a pin of segmental plate 90 locked in a notch, the carriage 13, of which rack 95 is a part, becomes locked, hence the selected type of the type wheel cannot be displaced, so long as finger pressure is continued on the selected key.

Having selected a particular character on the type wheel by operating a correspondingly identified key of the keyboard and having locked the keyboard, the latter may now be depressed upon the application of a downwardly directed pressure thereon to tilt the type wheel in order that the selected type thereof can cast an impression against the platen, that is, although the carriage 13 is locked, the keyboard may be moved downwardly relative thereto. Following the impression cast by the selected type, the keyboard is automatically elevated due to the release of spring 77 which causes arm 58 to move forwardly and consequently yoke 48 is rocked. The forward portion 47 of the yoke acts on strap 42, and the latter raises the keyboard 20. When the arm 58 is retracted by spring 77, arm 70 and flange 66 are also retracted, and hence shaft 68 is restored to its normal vertical position.

Where it is desired to print capital letters, either of the shift keys 99 may be depressed. If either be depressed, levers 76 are rocked on the fixed fulcrum rod 100, and extension 102 common to the levers is elevated or raised.

If extension 102 is raised, its terminal bifurcation 75 is also elevated. The arms 103 and 104 of the bifurcation 75 each include a pin or projection 74 slidably interposed between spaced annular flanges 105 and 106 of a collar 107 rigidly secured to shaft 68. Hence, if the extension 102 is raised by actuating a shift key lever, collar 107 is raised, and consequently, shaft 68 is bodily raised and slidably guided in bearing 67, thus causing the capital letter type as 108 to be disposed at a proper elevation preparatory to printing.

As the collar 107 moves upwardly, helicoidal spring 109 encircling shaft 68 is compressed and it is held compressed so long as finger pressure is applied to a shift key lever. If this finger pressure be removed, spring 109 expands and consequently the collar and its shaft are bodily moved downwardly.

In other words, the normal position of the type wheel relative to the platen is such that the type as 84 for small letters of the alphabet will selectively strike the platen after the keyboard is depressed and shaft 68 is not elevated before tilting. For printing large size letters, shaft 68 is elevated, but its upward vertical displacement is limited by ring 69 fixedly connected thereto, ring 69 cooperating with flange 66 of arm 58 for this purpose.

Suppose, for example, it is desired to print the large letter "H". First the operator depresses a shift key lever, which causes the type wheel to be elevated. Subsequently, to select a corresponding large letter "H" on the type wheel the operator, in a manner as previously pointed out, moves the settable keyboard to the left until the boss identified by the letter "H" strikes the finger piece member 80. The keyboard is then depressed, causing the type wheel to swing against the platen.

Pursuant to each printing operation, the platen is advanced one step to the left. For this purpose, an irregularly shaped arm 110 carried by yoke 59 is utilized to actuate a pivotally supported bellcrank lever 111 associated with a track 112 adapted to slidably guide the platen carriage 113 having a forwardly disposed rack or plurality of spaced teeth 114.

A leaf spring 115 has one end secured to the long arm 116 of bell crank lever 111, and has its free end removably disposed between a pair of teeth of rack 114. The body of spring 115 is curved and its free end is normally urged in a direction towards rack 114. The helicoidal spring 117 has one end secured to the long arm 116 and automatically urges the latter to swing to the left (see Fig. 1), and consequently arrange the free end of leaf spring 115 between a pair of teeth of rack 114 thereby locking the platen carriage 113.

However, if the keyboard be depressed, the type wheel is swung towards the platen, that is, yoke 59 is actuated and hence, arm 110 carried thereby is correspondingly displaced, namely its upper portion as 118 thereof moves rearwardly, striking short arm 119 of the bell crank lever 111. It follows, therefore, that the latter swings bodily on its pivot pin 121, causing the long arm 116 to move to the right. Consequently, leaf spring 115 first disengages the teeth of rack 114 and subsequently is withdrawn from opening 120 of the platen carriage rack 114.

When finger pressure is removed from the keyboard, spring 77 causes yoke 59 to retract automatically and hence arm 110 is retracted. Also spring 117 retracts long arm 116 of the bell crank lever 111. Accordingly, leaf spring 115 is retracted and the free end thereof falls into the notch between the next succeeding teeth of the rack, thus causing the platen carriage to be moved or urged by the curved spring 115 automatically one step to the left. In other words, after each printing operation, the platen is moved or advanced one step.

If, for example, the small letter "a" is to be printed, a finger of the operator is placed on the key or boss identified by capital letter "A", and the keyboard is slidably moved to the right until the finger of the operator strikes and actuates the central finger piece member 30. Hence, the keyboard carriage is locked in a desired position. Also the type wheel is in a selected position. The keyboard is now depressed and the type wheel casts its proper impression against the platen.

After printing, however, the finger pressure on the part of the operator is removed from the selected key of the keyboard, the latter raises automatically due to the operation of spring 77 and subsequently, both the keyboard and carriage are automatically moved to their normal position, that is, centered, as illustrated in Fig. 1. To restore the keyboard and its carriage to their normal central position after the keyboard has been slidably displaced, either to the right or left, two longitudinally disposed springs 122 and 123 are utilized. Spring 122 has its outer end fastened to side 16 of carriage 13, and its inner end is secured to the stationary guide pin 124 secured to wall 15 of the spacing support 11. Pin 124 is received in a longitudinally disposed guide slot 125 of the lower wall 14 of the keyboard carriage 13, and consequently, guides the latter when laterally and bodily displaced, either to the right or to the left.

Spring 123 has its inner end secured to the fixed pin 124 and its outer end to side 17 of the keyboard carriage 13. Normally, springs 122 and 123 are under initial tension and balanced, and the keyboard is centrally located relative to the fixed support 11.

If the keyboard be displaced, either to the left or right from its normal central position, springs 122 and 123 become unbalanced. When manual pressure is removed from the keyboard, and if the latter be out of its central position, springs 122 and 123 are out of balance and the keyboard automatically returns to its normal position by reason of the selfbalancing action of springs 122 and 123.

Associated with the type wheel 72 is a pair of inking rollers 130 and 131 freely and rotatably sustained by brackets as 132 carried by casing 88. Normally, the inking rollers are in contact with the type wheel, and if the latter is rotated, the rollers are also rotated, and consequently coat the type of the type wheel with a supply of ink as the type wheel is rotated.

The foregoing disclosure has been given by way of preference only for readily understanding the method and means employed in carrying out the principles of the invention, and while a certain embodiment has been particularly set forth and illustrated, it is to be understood that other modifications may be made within the scope of the appended claims, the terms of which are employed for the sake of clearness rather than by way of limitation.

What I claim and desire to secure by Letters Patent is:

1. In a toy typewriter, the combination of, a platen, a type wheel disposed in front of said platen, a bodily shiftable keyboard, means actuated upon lateral displacement of said keyboard for rotating said type wheel, and means for moving said type wheel against said platen upon downward displacement of said keyboard.

2. In a toy typewriter, the combination of, a platen, type carrying means disposed in front of said platen, a horizontally shiftable and vertically depressable keyboard, means actuated upon lateral displacement of said keyboard for setting said type carrying means, and means for moving said settable type carrying means against said platen upon downward displacement of said keyboard.

3. In a toy typewriter, the combination of, a platen, type carrying means, a bodily displaceable keyboard, means actuated upon lateral displacement of said keyboard for setting said type carrying means, and means upon removal of pressure from said keyboard for automatically retracting the latter.

4. In a toy typewriter, the combination of, a platen, type carrying means, a horizontally shiftable and vertically depressable keyboard, means actuated upon lateral displacement of said keyboard for setting said type carrying means, and means operable subsequent to the removal of pressure from said keyboard for automatically selfcentering the latter.

5. In a toy typewriter, the combination of, a platen, a slidable carriage, a bodily shiftable keyboard mounted on said carriage and operatively associated therewith, type carrying means operatively connected to said carriage, said keyboard being laterally shiftable in response to the application of a laterally directed pressure thereon, said carriage being bodily displaceable in response to laterally directed pressure on said keyboard for selectively setting said type carrying means in accordance with the displacement of said keyboard, and means independent of said keyboard to limit lateral displacement of the latter.

6. In a toy typewriter, the combination of, a platen, a shiftable carriage, a bodily shiftable keyboard operatively mounted on said carriage for bodily displacing the latter in accordance with the displacement of said keyboard, type carrying means, means in response to the displacing of said carriage for actuating said type carrying means for selectively setting the latter in accordance with the displacement of said keyboard, and stop means for limiting the displacement of said keyboard and for locking said carriage after said type wheel has been set in a selected position.

7. In a toy typewriter, the combination of, a platen, a bodily and horizontally shiftable carriage, a bodily and horizontally shiftable keyboard operatively mounted on said carriage and vertically displaceable relative thereto, type carrying means, means for laterally displacing said carriage in accordance with horizontal displacement of said keyboard, and means for setting said type carrying means in accordance with the displacement of said carriage.

8. In a toy typewriter, the combination of, a platen, a bodily shiftable carriage, a bodily shiftable keyboard operatively connected to said carriage and vertically depressable relative thereto, type carrying means, means for laterally displacing said carriage in accordance with horizontal displacement of said keyboard, means for setting said type carrying means in accordance with the displacement of said carriage, said keyboard being bodily depressable for moving said set type carrying means against said platen.

9. In a toy typewriter, the combination of, a bodily slidable carriage, a keyboard for laterally displacing said carriage, type carrying means settable in accordance with the displacement of said carriage, stop means for limiting the displacement of said keyboard, and means for locking said carriage pursuant to the operation of said stop means.

10. In a toy typewriter, the combination of, a platen, a bodily shiftable carriage, a keyboard bodily displaceable relative to said carriage and adapted to bodily displace the latter laterally in accordance with the horizontal displacement thereof, type carrying means operatively connected to said carriage and settable in accordance with horizontal displacement of the latter, means for limiting displacement of said keyboard, and means for locking said carriage pursuant to the operation of said limiting means for holding said type carrying means in a set position thereof, and means actuated upon manual displacement of said keyboard relative to said carriage for moving said type carrying means against said platen.

11. The toy typewriter according to claim 10, characterized in that the said type carrying means is automatically retracted from said platen, and said keyboard is vertically elevated and automatically horizontally retracted upon removal of pressure from said keyboard.

12. In a toy typewriter, the combination of, a platen, type carrying means, a horizontally shiftable and vertically depressable keyboard having a plurality of spaced and indicia identified bosses, said bosses adapted upon application of finger pressure thereon to initially and laterally displace said keyboard for setting said type means to a predetermined position of selection, an oscillatable centrally disposed stop for limiting lateral displacement of said keyboard, means for locking the latter pursuant to the oscillation of said stop, and means actuated upon downward displacement of said key-board and pursuant to the setting of said type carrying means for moving the latter against said platen.

13. In a toy typewriter, the combination of, a platen, rotatable type carrying means having spaced small and large type, a bodily shiftable keyboard laterally displaceable to set a selected portion of said carrying means in a predetermined position, and means for elevating said carrying means to dispose the large type of said selected portion in predetermined relation in respect to said platen, said keyboard being bodily depressable for moving said carrying means towards said platen to position said large type of said selected portion thereagainst.

14. In a toy typewriter, the combination of, a platen, rotatable and tiltable type carrying means, means for bodily elevating said carrying means relative to said platen, and a bodily shiftable keyboard laterally displaceable to set a selected portion of said carrying means in a predetermined position, said keyboard being depressable to tilt said carrying means and move said selected portion against said platen.

15. In a toy typewriter, the combination of a platen member, a type carrying member, a bodily shiftable keyboard, means actuated by lateral displacement of said keyboard for setting said type carrying member, and means for moving one of said members against the other upon downward displacement of said keyboard.

16. In a toy typewriter, the combination of, a platen member, a type-carrying member, a horizontally shiftable and vertically depressable keyboard, means operatively connecting the keyboard to said type-carrying member for causing setting of said type-carrying member by horizontal movement of the keyboard, and movement of one of said members into contact with the other member upon depression of the keyboard, an oscillatable stop extending over said keyboard, and locking means actuated by the stop for temporarily locking the keyboard against lateral displacement.

17. In a toy typewriter, a platen roller member, a type-carrying member, a horizontally shiftable and vertically depressable keyboard, and means operatively connecting the keyboard to the type-carrying member for causing setting of the latter upon lateral displacement of the keyboard, and movement of one of said members into contact with the other upon depression of said keyboard.

18. In a toy typewriter, a platen roller member, a type-carrying member, a horizontally shiftable and vertically depressable keyboard, means operatively connecting the keyboard to the type-carrying member for causing setting of the latter upon lateral displacement of the keyboard, and movement of one of said members into contact with the other upon depression of said keyboard, and automatic means for retracting said keyboard.

19. In a typewriter, the combination of, a platen roller member, a type wheel member, a horizontally shiftable and vertically depressable dummy keyboard having key characters thereon, means actuated upon lateral displacement of said keyboard for rotating said type wheel member, and means for moving one of said members into contact with the other upon downward displacement of said keyboard.

20. In a typewriter, the combination of, a platen roller member, a type wheel member, a horizontally shiftable and vertically depressable dummy keyboard having key characters thereon, means actuated upon lateral displacement of said keyboard for rotating said type wheel member, means for moving one of said members into contact with the other upon downward displacement of said keyboard, a shiftable stop member extending over said keyboard and adapted to be actuated by a finger of the operator upon lateral displacement of the keyboard, and means actuated by the stop member for temporarily locking the keyboard against lateral displacement.

21. In a typewriter, the combination of, a platen roller member, a type wheel member, a horizontally shiftable and vertically depressable dummy keyboard having key characters, means actuated upon lateral displacement of said keyboard for rotating said type wheel member, means for moving one of said members into contact with the other upon downward displacement of said keyboard, a shift key, and means actuated by the shift key for axially moving the type wheel member.

HARRY BATES.